United States Patent [19]

Sekiguchi et al.

[11] 4,446,839

[45] May 8, 1984

[54] METHOD AND APPARATUS FOR CONTROLLING EXHAUST GAS RECIRCULATION IN A DIESEL ENGINE

[75] Inventors: Kiyonori Sekiguchi, Aichi; Toshihiko Igashira, Toyokawa; Takeshi Tanaka; Hisasi Kawai, both of Toyohashi; Mitsumasa Yamada, Mishima; Michio Kawagoe; Masaaki Tanaka, both of Susono, all of Japan

[73] Assignees: Nippon Soken, Inc., Nishio; Toyota Jidosha Kabushiki Kaisha, Toyota, both of Japan

[21] Appl. No.: 396,682

[22] Filed: Jul. 9, 1982

[30] Foreign Application Priority Data

Jul. 10, 1981 [JP] Japan ................................ 56-106918

[51] Int. Cl.³ ............................................ F02M 25/06
[52] U.S. Cl. ...................................... 123/569; 123/571
[58] Field of Search ................................ 123/569, 571

[56] References Cited

U.S. PATENT DOCUMENTS 4,369,753 1/1983 Sugiyama ........................... 123/569

Primary Examiner—Wendell E. Burns
Attorney, Agent, or Firm—Cushman, Darby & Cushman

[57] ABSTRACT

A method and an apparatus for controlling EGR in a diesel engine according to the present invention used an EGR valve having a diaphragm chamber, a pressure supplying device for supplying air pressure to the diaphragm chamber, an adjusting device for adjusting the air pressure corresponding to the rotation angle of a rotary shaft for controlling the amount of fuel injected, a rotation rate detector of the engine, and a pressure releasing device for releasing a portion of the negative pressure in said diaphragm chamber. In the method and apparatus, a portion of the negative pressure in the diaphragm chamber is released to an atmospheric pressure corresponding to the rotation rate of the engine. Thus, the rate of EGR is decreased in accordance with an increase in the rotation rate in an operating condition higher than a predetermined rotation rate.

4 Claims, 5 Drawing Figures

METHOD AND APPARATUS FOR CONTROLLING EXHAUST GAS RECIRCULATION IN A DIESEL ENGINE

BACKGROUND OF THE INVENTION

1. Field of the Invention

The present invention relates to a method and an apparatus for controlling exhaust gas recirculation (EGR) in a diesel engine.

2. Description of the Prior Art

Usually, in EGR in a diesel engine, the more the amount of EGR increases the more the amount of hydrocarbon (HC) in the exhaust gas increases. On the other hand, if the amount of EGR is very small, a decrease in nitrogen oxide (NOx) in the exhaust gas cannot be expected. Accordingly, it is reasonable to determine the optimum amount of EGR so as to minimize the total weight of NOx and HC. On the basis of this, after an experiment was carried out by the inventors of the present invention, it became apparent that the rate of EGR in the engine must be decreased in accordance with an increase in the rotation rate of the engine. Consequently, it was found that the amount of EGR should be controlled so as to multiply the value of the rate of EGR illustrated in FIG. 1 by the correction coefficient $C_R$, which represents the rate of reduction of the rate of EGR in accordance with the rotation rate, as defined in equation (1) below.

$$C_R = -(1/4000)N + (5/4) \quad (1)$$

where N is the rotation rate of the engine expressed by revolutions per minute (rpm).

The above-mentioned relationship is applied in an operating condition higher than approximately 1,000 rpm, and in an operating condition lower than approximately 1,000 rpm, it is desirable to reduce the rate of EGR in accordance with the reduction of the rotation rate because during idling or the like EGR causes delay of the ignition timing to increase. As a result, an increase in variation in the engine and an increase in noise is unavoidable.

In a conventional EGR apparatus, as mentioned above, the apparatus is not operated according to the corrected rate of EGR, i.e., the multiplied value of the rate of EGR by the correction coefficient $C_R$, and, consequently, a satisfactory decrease in HC can not always be achieved.

The present invention is proposed in order to minimize the above-mentioned disadvantages.

SUMMARY OF THE INVENTION

The object of the present invention is to provide a method and an apparatus for controlling EGR in a diesel engine in which, by detecting the rotation rate, computing the rate of decrease of EGR from the detected rotation rate, and decreasing the amount of EGR according to the rate of decrease, an increase in HC in the exhaust gas is suppressed and an optimum EGR is achieved.

DESCRIPTION OF THE PREFERRED EMBODIMENTS

Figure 2:
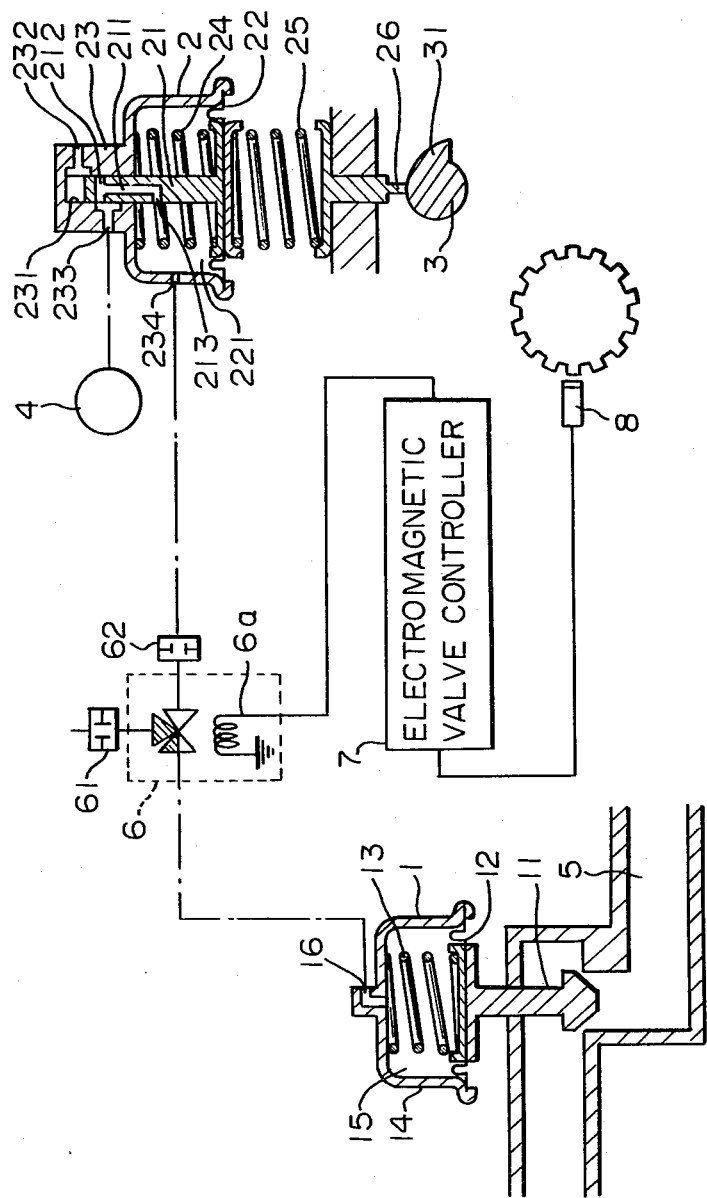
FIG. 2 is a schematic diagram illustrating the constitution of an apparatus for carrying out a method for controlling EGR in a diesel engine according to an embodiment of the present invention.

An apparatus for carrying out a method for controlling EGR in a diesel engine according to an embodiment of the present invention is shown in FIG. 2. The main elements of the apparatus are EGR valve 1, constant-pressure valve 2, rotary shaft 3 for controlling the amount of fuel, vacuum pump 4, electromagnetic valve 6, electromagnetic valve controller 7 for controlling the ratio of the opening time to the closing time, and rotation rate detector 8.

EGR valve 1 is located virtually at the center of EGR pipe 5, which connects an exhaust pipe with an air inlet pipe in the diesel engine. EGR valve 1 consists of valve body 11, diaphragm 12, spring 13, and casing 14. Valve body 11 moves up and down together with diaphragm 12, and when the lift value is zero, EGR pipe 5 is closed. Diaphragm chamber 15 is made of casing 14 and diaphragm 12. Negative pressure is applied to diaphragm chamber 15 by constant-pressure valve 2 through port 234, orifice 62, electromagnetic valve 6, and aperture 16 provided on casing 14. Diaphragm 12 lifts valve body 11 due to the negative pressure exerted against spring 13.

Constant-pressure valve 2 is constituted of valve body 21, diaphragm 22, casing 23, first spring 24, second spring 25, and cam follower 26. Cylinder 231 is provided the upper portion of casing 23, and the upper portion of valve body 21 slides along cylinder 231. Cylinder 231 has air port 232, which leads to the open air, and vacuum port 233, which leads to vacuum pump 4. Air port 232 is positioned higher than vacuum port 233.

Path 211, which has apertures at the upper end and lower end thereof, is provided at the center portion of valve body 21. Upper aperture 212 matches vacuum port 233 and air port 232, and lower aperture 213 opens to diaphragm chamber 221. Diaphragm chamber 221 is made of casing 23 and diaphragm 22. Either the open air is introduced through air port 232, upper aperture 212, path 211, and lower aperture 213 into diaphragm chamber 221 or negative pressure is introduced through vacuum port 233, upper aperture 212, path 211, and lower aperture 213 into diaphragm chamber 221. Whether the open air is introduced into diaphragm chamber 221 or whether negative pressure is introduced into diaphragm chamber 221 is determined by the degree of lift of valve body 21. Valve body 21 is moved upwardly or downwardly by diaphragm 22. When the lift of valve body 21 is zero, only negative pressure is introduced into diaphragm chamber 221, and when the degree of lift of valve body 21 is high, only the open air is introduced into diaphragm chamber 221. However, when the degree of lift of valve body 21 is medium, sometimes both negative pressure and the open air are introduced into diaphragm chamber 221.

Figure 1:
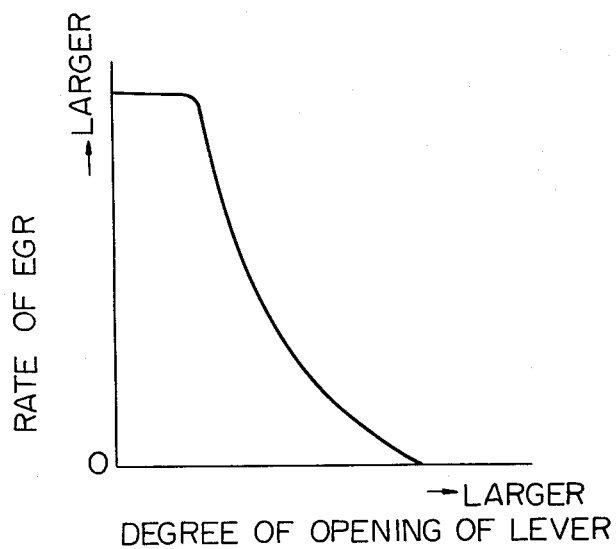
FIG. 1 is a graph illustrating the general relationship between the degree of opening of the lever for controlling the amount of fuel injected and the rate of EGR in a system for controlling EGR in a diesel engine.

Valve body 21 is lifted against spring 24. If the negative pressure in diaphragm 221 becomes high and the degree of lift of valve body 21 becomes great, the open air is introduced into diaphragm chamber 221 and the negative pressure is decreased. Accordingly, the negative pressure in diaphragm chamber 221 is maintained at the pressure value, the negative pressure being determined according to the preset load of first spring 24. The negative pressure is introduced into diaphragm chamber 15 of EGR valve 1 through port 234 provided at the side of casing 23. The preset load of second spring 25 is the same as that of first spring 24, and the preset load of first spring 24 is determined according to the preset load of second spring 25. The preset load of second spring 25 is determined according to the degree of lift of cam follower 26. The degree of lift of cam follower 26 is determined by cam 31. Cam 31 is driven by rotary shaft 3 so as to control the amount of fuel injected, and rotary shaft 3 is linked to the lever for controlling the amount of fuel injected. Thus, the air pressure of diaphragm chamber 221 is adjusted in accordance with the angle of a rotary shaft for controlling the amount of fuel injected. The cam profile of cam 31 cooperates with the operation of EGR valve 1 so that the relationship shown in FIG. 1 realized. Electromagnetic valve 6 is provided on the path connecting constant-pressure valve 2 with EGR valve 1 through orifice 62. Electromagnetic valve 6 changes the ratio of the releasing time of the air to the supplying time of the negative pressure applied from constant-pressure valve 2 so that electromagnetic valve 6 performs functions to decrease the negative pressure applied to EGR valve 1 at a signal from electromagnetic valve controller 7. Electromagnetic valve 6 has a path to the open air through orifice 61, and the pressure is adjusted to an optimum pressure by orifice 61.

Figure 3:
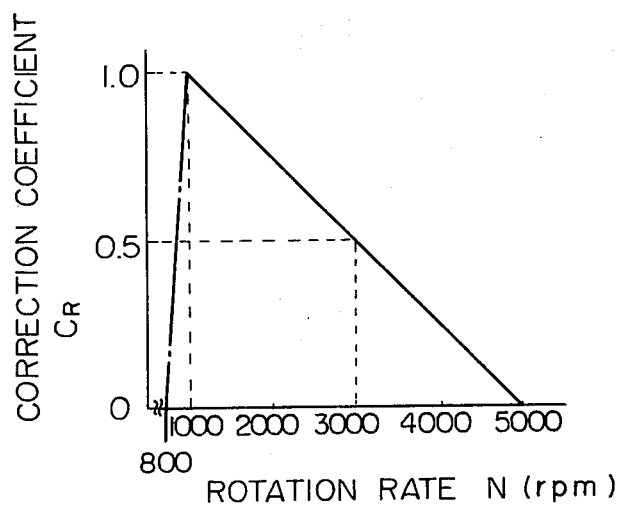
FIG. 3 is a graph illustrating the relationship between the rotation rate of the engine and the correction coefficient of EGR in the apparatus of FIG. 2.

Electromagnetic valve controller 7 for controlling the ratio of the opening time to the closing time receives a rotation signal from rotation rate detector 8 of the engine, operates the signal according to the equation (1), and supplies an output corresponding to the ratio of the supplying time of the negative pressure in electromagnetic valve 6 according to the obtained results, namely, the correction coefficient $C_R$. The relationship between the rotation rate N of the engine and the correction coefficient $C_R$ is shown in FIG. 3.

Rotation rate detector 8 is located at a position in which it is capable of detecting the rotation rate of the engine. After detecting the rotation rate, the detector 8 supplies a signal to electromagnetic valve controller 7.

Figure 4:
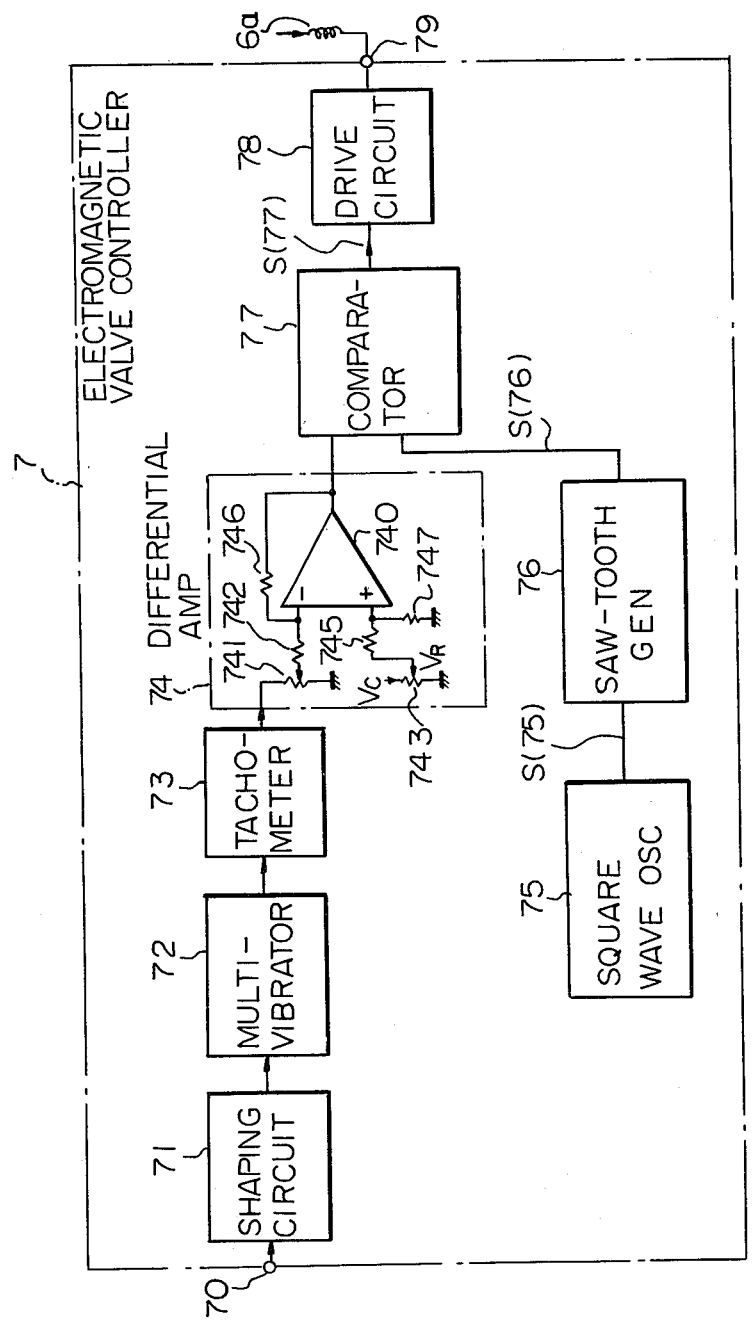
FIG. 4 is a block diagram of a circuit illustrating an electromagnetic valve controller for controlling the ratio of the opening time to the closing time in the apparatus of FIG. 2.

Electromagnetic valve controller 7 will be explained below with reference to FIG. 4. The output of rotation rate detector 8 is supplied to input terminal 70. Input terminal 70 is connected to an input terminal of shaping circuit 71 in electromagnetic valve controller 7. In shaping circuit 71, the signal from rotation rate detector 8 is amplified and a waveform of the signal is shaped. The output of shaping circuit 71 is supplied to the input of monostable multivibrator 72. The output of monostable multivibrator 72 is supplied to tachometer circuit 73. Monostable multivibrator 72 converts the pulse from shaping circuit 71 to a pulse having a certain pulse width. Tachometer circuit 73 converts the pulse frequency from monostable multivibrator 72 to an analog voltage. The constitution and operation of circuit 73 is described in detail, for example, on pages 190 to 192 in "New Application Technique for an Operational Amplifier", published by Seibundoshinkosha on Feb. 15, 1975. The output of tachometer circuit 73 is supplied to one stationary terminal of variable resistor 741 in differential amplifier 74. The other stationary terminal of variable resistor 741 is grounded, and a terminal of a moving contact thereof is connected to an inverting input terminal of operational amplifier 740 through resistor 742. One stationary terminal of variable resistor 743 is supplied with a constant voltage, and the other stationary terminal is grounded. A terminal of a moving contact thereof is connected to a non-inverting input terminal of operational amplifier 740 through resistor 745. Resistor 746 is connected between the inverting input terminal and the output terminal of operational amplifier 740. Resistor 747 is connected between the non-inverting input terminal of operational amplifier 740 and the ground. The output voltage of variable resistor 741 is adjusted to voltage $V_X$, which corresponds to the value of $(1 \div 4000)$ in the equation (1). On the other hand, the output voltage of variable resistor 743 is adjusted to voltage $V_R$, which corresponds to the value 5/4 in the equation (1). Each of resistors 742, 745, 746, and 747 have the same resistance value. Therefore, output voltage V of operational amplifier 740 is equal to the voltage $(V_R - V_X)$. The output voltage is supplied to a non-inverting input of comparator 77.

Figure 5A:
FIG. 5 is a diagram illustrating a waveform in the circuit of FIG. 4.
Figure 5B:
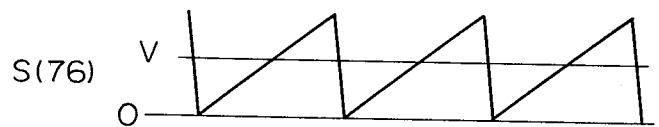

The output of square wave oscillator 75 is supplied to the input of sawtooth wave generator 76. Output waveform S(75) of square wave oscillator 75 is shown in FIG. 5(A). The output of sawtooth wave generator 76 is supplied to the inverting input of comparator 77. Output waveform S(76) of sawtooth wave generator 76 is shown in FIG. 5(B).

Figure 5C:
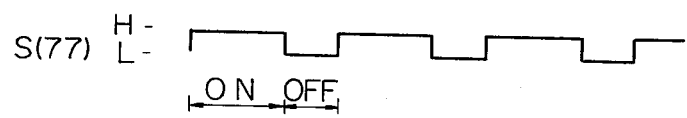

In comparator 77, output voltage V of differential amplifier 74 is compared with output voltage $V_S$ of sawtooth wave generator 76. When $V_S \geq V$, a low level voltage L is generated at the output of comparator 77, and when $V_S < V$, a high level voltage H is generated at the output of comparator 77. Output waveform S(77) of comparator 77 is shown in FIG. 5(C). The output of comparator 77 is supplied to the input of drive circuit 78. Drive circuit 78 amplifies the power of the output signal of comparator 77 so as to drive electromagnetic valve 6. The output terminal of drive circuit 78 is connected to one terminal of coil 6a of electromagnetic valve 6 through output terminal 79 of electromagnetic valve controller 7. The other terminal of coil 6a of electromagnetic valve 6 is connected to the positive pole of a battery.

In summary, the output voltage of tachometer circuit 73 is proportional to the rotation rate N in the equation (1). The voltage is divided by variable resistor 741, and voltage $V_X$, which is proportional to $(1 \div 4000 \times N)$, is obtained at the inverting input terminal of operational amplifier 740. Voltage $V_R$, which is proportional to 5/4, by variable resistor 743 is set to the non-inverting input terminal of the operational amplifier 740. As a result of these operations, output voltage V of differential amplifier 74 becomes $(V_R - V_X)$. Output voltage V is proportional to $C_R$ in the equation (1). In order to convert voltage V to a pulse signal which has a constant frequency and a duty factor corresponding to voltage V, output signal $V_S$ (S(76)) of sawtooth wave generator 76 is compared with output voltage V of differential amplifier 74. As mentioned above, electromagnetic valve controller 7 generates a pulse signal having a duty factor which corresponds to the equation (1).

According to the above-mentioned apparatus, when the rotation rate of the engine becomes high, the rate of EGR can be decreased, as shown by the solid line in FIG. 3. Further, by using a similar control apparatus (not explained in detail), it is possible to reduce the rate of EGR to less than 1,000 rpm in accordance with the reduction of the rotation rate as shown by the chain line in FIG. 3. Thus, it is possible to desirably control EGR in the idling state and prevent the engine from vibrating and generating noise.

We claim:

1. A method for controlling EGR in a diesel engine having an EGR valve, a pressure supplying means for supplying air pressure to a diaphragm chamber of said EGR valve, a pressure control valve for adjusting said air pressure in accordance with the rotation angle of a rotary shaft for controlling the amount of fuel injected, a three-way valve for partially releasing said adjusted air pressure to an atmospheric pressure, a first fixed throttle provided between said three-way valve and said pressure control valve, a second fixed throttle provided at an inlet of said three-way valve leading to an atmosphere, a rotation rate detector, and a control means, comprising the steps of:

detecting the rotation rate of the engine,
 controlling the ratio of the opening time to the closing time of said three-way valve, and
 partially releasing the negative pressure in said diaphragm chamber to an atmospheric pressure corresponding to the rotation rate of the engine detected by the rotation rate detector,
 whereby the rate of EGR is decreased in accordance with an increase in the rotation rate, at least in an operating condition higher than a predetermined rotation rate.

2. An apparatus for controlling EGR in a diesel engine, comprising:

an EGR valve having a diaphragm chamber;
 a pressure supplying means for supplying air pressure to said diaphragm chamber;
 a pressure control valve for adjusting said air pressure in accordance with the rotation angle of a rotary shaft for controlling the amount of fuel injected;
 a three-way valve for partially releasing said adjusted air pressure to an atmospheric pressure;
 a first fixed throttle provided between said three-way valve and said pressure control valve;
 a second fixed throttle provided at an inlet of said three-way valve leading to an atmosphere;
 a rotation rate detector for detecting the rotation rate of the engine; and
 control means for controlling the ratio of the opening time to the closing time of said three-way valve so as to partially release the negative pressure in said diaphragm chamber to an atmospheric pressure corresponding to the rotation rate of the engine,
 whereby the rate of EGR is decreased in accordance with an increase in the rotation rate, at least in an operating condition higher than a predetermined rotation rate.

3. A method as set forth in claim 1, wherein a correction coefficient applied to an EGR rate is decreased steeply when the rotation rate is less than the predetermined rotation rate.

4. An apparatus as set forth in claim 2, wherein a correction coefficient applied to an EGR rate is decreased steeply when the rotation rate is less than the predetermined rotation rate.

* * * * *